(12) United States Patent
Nijim et al.

(10) Patent No.: US 11,863,465 B1
(45) Date of Patent: Jan. 2, 2024

(54) LOCAL NETWORK TRAFFIC PRIORITIZATION FOR IMPROVED QUALITY OF SERVICE

(71) Applicant: Cox Communications, Inc., Atlanta, GA (US)

(72) Inventors: Yousef Wasef Nijim, Cumming, GA (US); Michael Paul Overcash, Duluth, GA (US); James Alan Strothmann, Johns Creek, GA (US); Anthony Joseph Insinga, Powder Springs, GA (US)

(73) Assignee: Cox Communications, Inc., Atlanta, GA (US)

( * ) Notice: Subject to any disclaimer, the term of this patent is extended or adjusted under 35 U.S.C. 154(b) by 403 days.

(21) Appl. No.: 16/999,588

(22) Filed: Aug. 21, 2020

(51) Int. Cl.
*H04L 47/80* (2022.01)
*H04L 47/2425* (2022.01)
*H04L 47/2441* (2022.01)

(52) U.S. Cl.
CPC ........ *H04L 47/805* (2013.01); *H04L 47/2433* (2013.01); *H04L 47/2441* (2013.01)

(58) Field of Classification Search
None
See application file for complete search history.

(56) References Cited

U.S. PATENT DOCUMENTS

| | | | | | |
|---|---|---|---|---|---|
| 8,300,653 | B2 * | 10/2012 | Smith | ............... | H04L 1/1887 709/236 |
| 8,612,612 | B1 * | 12/2013 | Dukes | ............... | H04L 67/141 709/203 |
| 11,509,498 | B1 * | 11/2022 | Overcash | ............ | H04L 12/2856 |
| 11,540,026 | B2 * | 12/2022 | Mukaiyachi | .......... | H04L 65/613 |
| 2004/0068668 | A1 * | 4/2004 | Lor | ........................ | H04L 69/329 709/224 |
| 2006/0174035 | A1 * | 8/2006 | Tufail | ...................... | H04L 45/02 709/239 |
| 2006/0221933 | A1 * | 10/2006 | Bauer | .................... | H04W 40/12 370/352 |
| 2011/0131319 | A1 * | 6/2011 | Harrang | ............... | H04L 47/2416 709/224 |
| 2012/0327778 | A1 * | 12/2012 | Stanwood | ............ | H04L 47/6275 370/329 |

(Continued)

OTHER PUBLICATIONS

Greg White, "Low Latency DOCSIS Overview & Performance," Cable-Tec Expo, 23 pages (2019).

*Primary Examiner* — Mariela Vidal Carpio
(74) *Attorney, Agent, or Firm* — Merchant & Gould P.C.

(57) ABSTRACT

Intelligent bandwidth prioritization and allocation are provided. Data about a local network and devices connected to the network may be collected, monitored, measured, and tracked over time for generating a profile about a subscriber. For example, the profile may comprise a data-based representation of the data transmission capabilities and data usages and behaviors associated with the subscriber network that can be used for identifying network performance issues, to determine traffic classification, classification criteria, and priority values for automatically classifying traffic flows, and to determine bandwidth allocation rules, optimizations, and other traffic management instructions that can be automatically implemented by the access point to optimize performance of data flows.

20 Claims, 7 Drawing Sheets

(56) References Cited

U.S. PATENT DOCUMENTS

| | | | |
|---|---|---|---|
| 2015/0304187 A1* | 10/2015 | Brown | G06F 3/0484 |
| | | | 715/736 |
| 2016/0165481 A1* | 6/2016 | Jin | H04W 28/0263 |
| | | | 370/236 |
| 2017/0078208 A1* | 3/2017 | Panin | H04L 67/61 |
| 2019/0149475 A1* | 5/2019 | Martin | H04L 47/12 |
| | | | 370/235 |
| 2019/0236527 A1* | 8/2019 | Bhaumik | G06Q 10/087 |
| 2020/0029339 A1* | 1/2020 | Suzuki | H04K 3/822 |
| 2020/0296026 A1* | 9/2020 | Michael | H04L 45/745 |
| 2020/0382426 A1* | 12/2020 | Li | H04L 47/34 |
| 2020/0401309 A1* | 12/2020 | De Roeck | G06F 3/064 |
| 2021/0352020 A1* | 11/2021 | Iwasawa | H04L 47/52 |

* cited by examiner

LOCAL NETWORK TRAFFIC PRIORITIZATION FOR IMPROVED QUALITY OF SERVICE

BACKGROUND

A technical problem exists with sharing a limited amount of bandwidth amongst a plurality of client devices on a network. For example, a network service provider may provide subscribers with access to a wide area network via one or more connection types. A network connection may provide a limited amount of bandwidth to a subscriber premises (e.g., based on network infrastructure constraints, capacity issues, or on a subscription type or level). As can be appreciated, a higher bandwidth amount may allow for greater amounts of data to be transmitted within a time period, which can enable faster content load and response speeds.

The amount of bandwidth available to a subscriber may be shared amongst various other subscribers on a node, and the amount of bandwidth available on a subscriber's local network may be shared amongst the various client devices connected to it. Different tasks and actions performed online have different data demands and speed demands, and the amount of data available to a particular client device may be dependent upon the number of other client devices connected to the local network and the online tasks being performed on those devices. Typically, a router may allocate bandwidth to traffic as needed without regard for what the services are consuming the bandwidth. For example, if one user at a premises, such as a parent, is using one connected client device for an online video conference call and another user at the premises, such as a child, starts to use another connected client device to start streaming a video, the router may share the available bandwidth between the two services without considering which may be more important, and accordingly, the quality of the online video conference call may drop. The more data demanded from various clients connected to the local network, the higher the likelihood that speeds for all client devices may be negatively impacted and performance may be degraded.

There are times when it is highly desirable to prioritize the Internet traffic for specific users, devices, or applications over the needs of other users on the network. Accordingly, the present disclosure provides at least one technical solution to the technical problems associated with prioritizing traffic flow for improving network performance.

SUMMARY

Aspects of the present disclosure disclose a system, method, and computer readable storage media, but are not so limited, to provide an intelligent bandwidth prioritization manager that determines and implements prioritization rules and bandwidth allocation and other traffic management parameters for a router to utilize for optimized network performance. The intelligent bandwidth prioritization manager may be configured to monitor, measure, and optimize bandwidth allocation of local network traffic and thereby increase network performance. Aspects of the present disclosure may increase network performance with respect to latency sensitive activities.

The details of one or more aspects are set forth in the accompanying drawings and description below. Other features and advantages will be apparent from a reading of the following detailed description and a review of the associated drawings. It is to be understood that the following detailed description is not intended to be restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
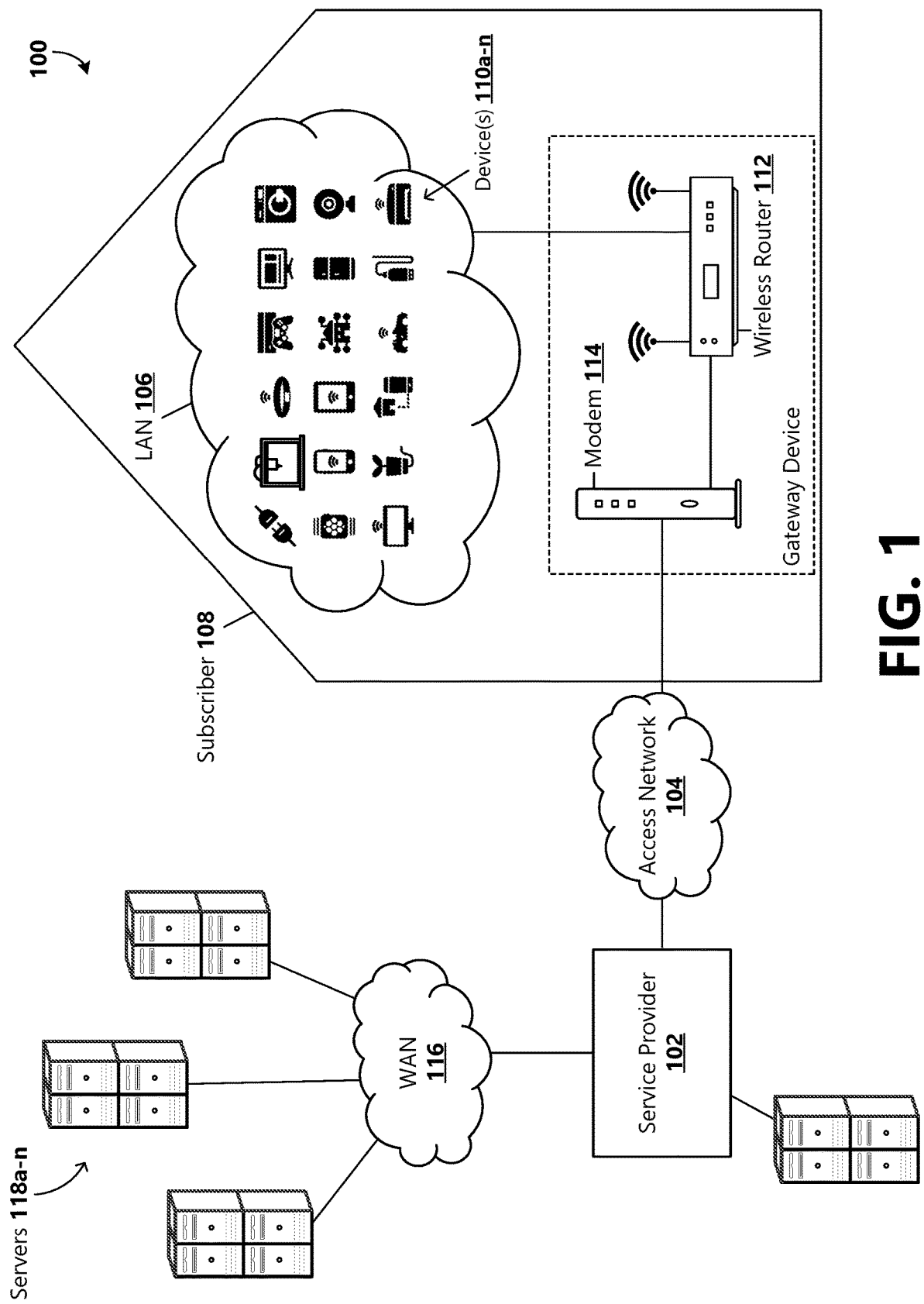
FIG. 1 is a block diagram of an example environment in which aspects of the present disclosure can be implemented.

FIG. 1 is a block diagram of an example communication environment 100 that includes a service provider 102 that provides one or more services (e.g., video, telephony, Internet data, etc.) to a plurality of subscribers (generally 108) via a connection to one or a combination of networks. As an example, the service provider 102 may provide a subscriber's premises with a connection to an access network 104 comprising a fiber to the premises (FTTP), a hybrid fiber coax communication infrastructure, or other communication infrastructure configured to provide access to cable television (CATV) services and access to a wide area network (WAN) 116 (e.g., the Internet). For example, the WAN 116 may provide access to various remote servers 118a-n (generally 118), which may operate as sources of information and various services. The service provider 102 may provide services according to a standardized communication protocol, such as a version of the DOCSIS® standard, for example. The standardized communication protocol according to which the service provider 102 operates may define upstream and downstream channels to enable bidirectional communications between the service provider 102 and the subscriber 108.

According to an aspect, the subscriber 108 premises includes a router 112 configured to provide a Local Area Network (LAN) 106 that various devices 110a-n (generally 110) are enabled to connect to for accessing services provided by the service provider 102 via the access network 104. The subscriber 108 premises further includes a modem 114 configured to connect the service provider's access network 104 to the router 112. In some examples, the modem 114 may be embodied as a gateway device that includes the router 112. In other examples, the router 112 and the modem 114 are separate devices that are communicatively connected. In various aspects, the router 112 may include one or more wired interfaces that enable one or more devices 110 to connect to the router 112 via an Ethernet cable. In additional aspects, the router 112 may include an access point 212 (FIG. 2) configured with wireless access point functionality that connects wireless-compatible devices 110 to the LAN 106 wirelessly using radio frequencies in various frequency bands. Accordingly, the LAN 106 may include a wireless LAN (WLAN). Devices 110 may include various types of computing devices such as servers, workstations, set top boxes, desktop computers, laptop computers, tablets, mobile phones, smart devices, gaming devices, video streaming devices, IoT devices, cameras, smart cars, one or more databases, etc. Further details of the computing devices and variations thereof can be found in FIGS. 6 and 7.

According to an aspect, the subscriber's connection to the service provider's access network 104 may be constrained to a limited amount of available bandwidth, wherein the available bandwidth may be a volume of information per unit of time that a transmission medium (e.g., the subscriber's network connection) can handle. For example, a network connection with a larger bandwidth may be enabled to move a set amount of data (e.g., a video file) faster than a network connection with a lower bandwidth. Bandwidth may be expressed in bits per second (e.g., 60 Mbps may describe a data transfer rate of 60 million bits (megabits) of data every second), and the amount of available bandwidth may be dependent on various factors, such as network infrastructure constraints, Wi-Fi-® airtime contention, capacity issues, on a subscription type or level, etc. As can be appreciated, as the amount of available bandwidth increases, the amount of data that can flow through the network connection to/from devices 110 connected to the LAN 106 increases. The bandwidth available to a subscriber 108 premises may be shared amongst the various devices 110 connected to the subscriber's LAN 106.

As the number of connected devices 110 downloading and/or uploading data increases, the amount of data that can be provided to each of the devices 110 in a given amount of time may be reduced. Accordingly, the various devices 110 may receive a portion of the full capacity of available bandwidth, which can slow transmission speeds and negatively affect time-sensitive activities. According to various aspects of the disclosure, a subscriber 108 may be provided a limited amount of bandwidth, and an Intelligent Bandwidth Prioritization (IBP) manager 214 (FIG. 2) described herein may be used to manage how the bandwidth is allocated to the various devices 110 communicating on the LAN 106. For example, allowing the devices 110 on the LAN 106 to battle for priority can have negative experiences, such as poor video streaming, choppy VoIP (Voice over Internet Protocol) calls, or lag in online gaming sessions. As an example, a time-sensitive activity may include a video-over-Internet call where the data (e.g., audio and video data) may be created and transmitted in real-time. Thus, the data may not be buffered (e.g., as opposed to downloading content that may be queued or buffered), and slower speeds may cause data packets to be delayed and dropped, resulting in poor video/audio quality (e.g., video and/or audio dropouts). As will be described in further detail below, the video-over-Internet call, which is latency-sensitive, may have a data transfer pattern (e.g., lower bandwidth data transfers sent at shorter intervals) that may correspond with a traffic classification and be used to identify, classify, and prioritize traffic flows that are latency-sensitive.

Currently, the router 112 may be configured to allocate bandwidth to various requesting devices 110 as needed without regard for the services/applications that may be consuming the bandwidth. Accordingly, some applications, which may be time-sensitive, may run slowly and/or experience poor video/audio quality, particularly if a large-bandwidth-usage application is using the available bandwidth. In other examples, the router 112 may be configured with QoS policies and QoS functions that allows a user to assign a priority value or level to a certain application, device 110, or traffic type, which the router 112 may apply in a QoS process as part of prioritizing traffic flows on the LAN 106 and determining how to allocate bandwidth between the prioritized traffic flows. For example, QoS rules/policies may be defined to prioritize and ensure good performance of time-sensitive applications or services on the LAN 106 and to internet access from the network compared to applications or services that may be less time-sensitive to lag. In some examples, a minimal amount of lag may be noticeable by a time-sensitive application/service and/or may render a time-sensitive application/service unusable. Some non-limiting examples of traffic flows of time-sensitive applications/services may include video streams, VoIP calls, and online gaming. Some non-limiting examples of traffic flows of less time-sensitive applications/services may include file downloads, torrents, software updates, emails, and general web browsing.

As can be appreciated, performance of some time-sensitive applications/services may be more important to a subscriber 108 than performance of other time-sensitive applications/services, which may not be taken into consideration by the router 112. For example, one user at a subscriber 108 premises may be a parent using a device 110 for an online video conference call and another user at the premises may be a child using another device 110 to play an online video game. Both traffic flows may be considered time-sensitive and prioritized, and the router 112 may share the available bandwidth between the two services without considering which may be more important, and accordingly, the quality of the online video conference call may drop. Moreover, configuring QoS settings in this way can be cumbersome, may require user knowledge of data usage of applications/services, knowledge of protocols, details about how the router 112 operates, and networking in general. In some cases, configuring a router's QoS settings may depend on a user-input of maximum upload and download speeds that the service provider 102 supports. Oftentimes, the user may not know such information and may enter incorrect values, or may configure QoS settings that cause traffic on the LAN 106 to perform worse instead of better. In other cases, users may be unaware of QoS features or may be intimidated (e.g., due to the above and/or other reasons) to reconfigure router 112 settings.

Additionally, some applications/services may not support multiplexing by TCP (Transmission Control Protocol) port. As an example, both high and low priority flows may use TCP and use a same TCP port (e.g., TCP port 443). Currently, without incorporating aspects of the present disclosure, the router 112 may be unable to determine whether the traffic is latency-sensitive or not based on the destination port and IP address (e.g., the IP address may continually change). For example, one method to differentiate between high and low priority flows may include deep packet inspection; however, this may not be possible with TLS traffic due to encryption. As another example, another method to differentiate between high and low priority flows may be to compare the IP address against lists of cloud service IP addresses; however, such lists may not generally be available. As such, a legacy QoS mechanism may not be effectively configured through a static prioritization configuration (e.g., by port or IP address). Accordingly, the available bandwidth may not be optimally distributed amongst devices 110 communicating on the LAN 106 and various devices 110 may experience latency and/or poor audio/video quality.

According to an implementation example, the router 112 can include or be communicatively connected to the IBP manager 214 (FIG. 2), described below, that operates in part to automatically monitor, measure, and manage bandwidth allocation for the router 112 to improve data transfer and network performance on the LAN 106. In some examples, the router 112 can work in conjunction with a cloud controller 208 (FIG. 2) of the service provider 102 as part of monitoring, measuring, and managing bandwidth allocation to optimize performance of data flows. In some examples, as part of managing bandwidth allocation, the IBP manager 214 may be configured to collect data associated with the subscriber's network connection, the LAN 106, the router 112, access points 212, and devices 110 operating and communicating on the LAN 106; use the collected data as parameters evaluated in one or a combination of prioritization rules used to prioritize traffic flows; assign priority values to the traffic flows based on the evaluation(s), and determine and implement one or more bandwidth allocation optimizations that optimize performance of data flows. The bandwidth allocation optimizations may be configured to prevent congestion, packet delays, and packet loss of all or a prioritized set of traffic, thus improving application/service performance and user experience. In some examples, a particular bit rate, delay, delay variation, packet loss, or bit error rate may be guaranteed. In some examples, one or more components of the IBP manager 214 may be included in the router 112. In other examples, one or more components may be included in a separate device local to the LAN 106 and operatively connected to the router 112. In other examples, one or more components may operate on a remote server 118 in a distributed network, such as the WAN 116, on a server or other network device at the service provider head end 202 (FIG. 2), or in the service provider access network 104.

Figure 2:
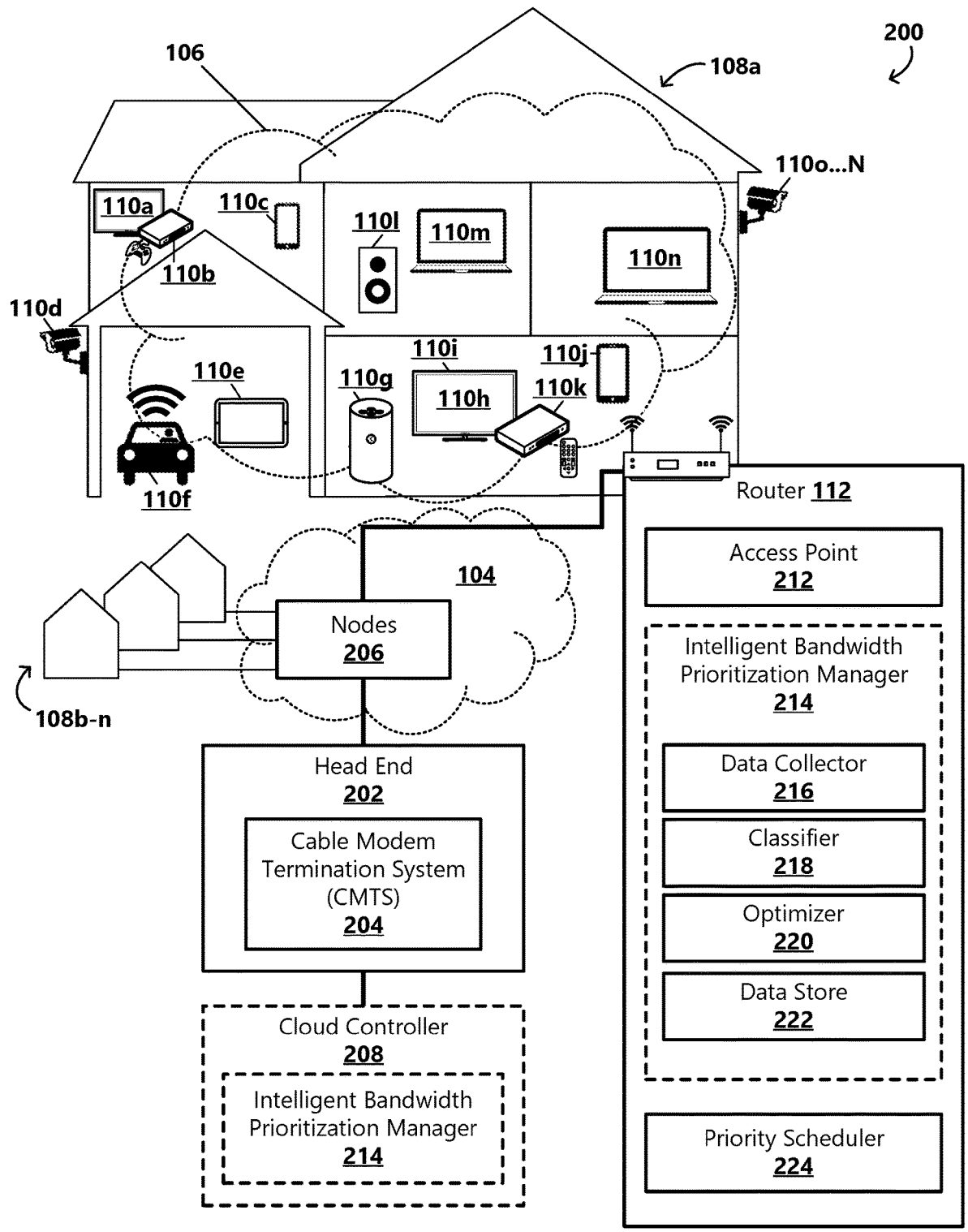
FIG. 2 is a block diagram showing components of an example system configured to provide traffic prioritization and bandwidth allocation according to an embodiment.

FIG. 2 is a block diagram of an example system incorporated in an operating environment 200 where the service provider access network 104 is embodied as an HFC network and the subscriber LAN 106 is implemented at a subscriber's 108 premises, such as a residential or a business location. As should be appreciated, in other examples, the service provider access network 104 may be implemented as an FTTP network or other type of other communication infrastructure. The term "subscriber" may generally include the individual or business entity in an agreement with the service provider 102 to receive services and the premises at which those services are received. Components of the system 200 can be integrated, distributed, and/or provided in any combination of separate systems/components, wherein FIG. 2 provides one implementation example. The HFC network may extend from a head end 202 of the service provider 102 to a plurality of network nodes 206, where each node serves a plurality of subscribers 108a-n (generally 108). For example, each node 206 may serve 200 to 1,000 subscribers 108 within a service area where the subscribers may subscribe for residential and/or business services.

The service provider 102 may use a cable modem termination system (CMTS) 204 located at the head end 202 to provide high speed data services such as cable, Internet, voice, data, etc., to the various subscribers 108. For example, the CMTS 204 may encode, modulate, and upconvert one or more of the services onto radio frequency (RF) carriers, combine the RF carriers into a single electrical signal, and provide the electrical signal to a broadband optical transmitter. The broadband optical transmitter may convert the electrical signal to a downstream optically modulated signal that is sent to one or more of the network nodes 206 over one or more fiber optic cable lines or conveying infrastructure.

In an HFC network, each node 206 may include a broadband optical receiver to convert the downstream optically modulated signal to an electrical signal (e.g., translate the signal from a light beam to RF). The node 206 may transmit the electrical signal over one or more coaxial cable lines to a modem 114 connected to a router 112 or to a gateway device comprising a modem 114 and a router 112 of a subscriber 108a serviced by the node 206. Each subscriber 108 within a set of subscribers 108a-n may have at least one router 112 at the subscriber premises. Upon receipt of the electrical signal, the modem 114 included in the gateway device 112 (or as a separate device) may demodulate the electrical signal in order to deliver the services to one or more devices 110a-n of the subscriber 108, including desktop computers, laptop computers, mobile phones, tablets, gaming devices, televisions, IoT devices, cameras, among other examples. In an FTTP network, a node 206 may operate as a distribution hub, and the modem 114 may comprise or be operatively connected to an Optical Network Terminator (ONT) configured to convert the downstream optically modulated signal to an electrical signal.

The access network 104 may operate bi-directionally, whereby signals are transmitted in both downstream and upstream directions. For example, downstream signals may transmit data from the head end 202 to the modem 114 and router 112 via the respective node 206. The data transmitted in the downstream signals may include content associated with the one or more services being provided, such as video content, voice data, and Internet data, among other examples. The upstream signals may transmit data from the router 112 and modem 114 to the head end 202 via the node 206.

With continuing reference to FIG. 2, the router 112 enables various connected devices 110 to join a LAN 106 and to communicate on the LAN 106 and to other devices and servers 118 connected to the WAN 116 via the service provider access network 104 (e.g., HFC network). As mentioned above, in an example aspect, the router 112 may include an access point 212 configured to connect devices 110 to the LAN 106 wirelessly (e.g., provide a wireless network). In some examples, the router 112 may also include or be operatively connected to a MoCA® interface operative or configured to support MoCA® communications in association with utilizing a coaxial cable network at the subscriber 108 premises to broadcast signals to connected devices 110 within a defined communications frequency range as defined by MoCA® standards.

In an implementation example, the router 112 may be configured with control circuitry to provide control signals to select communication components (e.g., devices 110, (integrated and additional) access point(s) 212, a priority scheduler 224, IBP manager 214 components) to implement intelligent bandwidth allocation on the LAN 106. The IBP manager 214 of an embodiment includes a data collector 216, a classifier 218, an optimizer 220, and a data store 222. In some examples, various components may be combined and/or distributed amongst a combination of separate systems/devices, which in some examples may include remote systems (e.g., cloud controller 208).

The data collector 216 is illustrative of a software application, module, or computing device operative or configured to collect various data from the router 112, access point(s) 212, and the devices 110 connected to the LAN 106. The data collector 216 may be further configured to communicate with other data sources (e.g., service provider 102), nodes 206, etc., for collecting various data. The collected data may include information about the access network 104, the connection to the subscriber's LAN 106, the LAN 106, the router 112 and access point(s) 212, and about the various devices 110 connected to the LAN 106. More specifically, the collected data may include information about the number and types of devices 110 connected to the LAN 106, an amount of bandwidth consumed by each device, applications/services used and the data usages of the applications/services, protocols used, types of data, dates and times of data usages, utilized frequency bands and channels, signal levels, network throughput, error rates, dropped frames, transmission delays, connection speeds, users, whether a device 110 is in an attended versus unattended state, etc.

In some examples, the devices 110 may send explicit signaling to the data collector 216 comprising information about the devices, network connection/performance information, application/service usage, and/or other usage data. For example, a device 110 may be configured to explicitly signal the application/service being utilized in association with a communication to the router 112. In some examples, the explicit signal may be provided as a DSCP (Differentiated Services Code Point) value included in the IP header. This information may be used alone or in combination with other collected/received data (e.g., IP address and port combination) to classify a traffic flow. For example, an IP address and port combination alone that may be included in the communication header may not be sufficient for determining whether an associated communication is latency-sensitive and should therefore be prioritized. Due at least in part to continually-changing cloud IP addresses, general non-availability of a list of cloud service IP addresses with which the IP address can be compared against, and/or other factors, the router 112 may not be able to effectively prioritize a traffic flow based on just an identification of the port and IP address. However, according to an aspect of the present disclosure, a traffic flow may be determined to be latency-sensitive and/or a degree of latency sensitivity may be determined for a traffic flow based at least in part on explicit signalling of an identification of the application/service associated with the traffic flow, which may correspond with a learned data transfer pattern and/or a traffic classification.

In some examples, the data collector 216 may be configured to request and collect data obtained by the router 112 as part of receiving and routing traffic between the access network 104 and devices 110 connected to the LAN 106. In other examples, the data collector 216 may be configured to apply one or more device discovery protocols according to characteristics of particular communication networks, devices and/or interfaces. Some example device discovery protocols may include a Dynamic Host Configuration Protocol (DHCP) Server discovery protocol, a DHCP version 6 (v6) Server discovery protocol, an Internet Protocol (IP)v6 Neighbor discovery protocol, an IPv6 Router advertisements discovery protocol, an Address Resolution Protocol (ARP) discovery protocol, a Simple Service Discovery Protocol (SSDP), a Universal Plug and Play (UPnP), a MoCA® controller discovery protocol, and/or Digital Living Network Alliance (DLNA) discovery protocol, a multicast Domain Name System (mDNS) discovery protocol, a Wi-Fi® Access Point discovery protocol, etc. An order, usage frequency, select protocol combinations, times, and/or intervals of protocol applications may be configurable and implemented in various ways. As should be appreciated, different and new types of discovery protocols can be implemented according to the particular hardware and communication architecture utilized in the service provider access network 104, the LAN 106, and/or other network and are within the scope of the present disclosure. Data collected by the data collector 216 and from an execution of any corresponding device discovery protocols may be stored in the data store 222. For example, the data store 222 may store discovery information collected and/or determined by one or more components of the IBP manager 214. All or a portion of the information may be obfuscated (e.g., using cryptographic hashing) to maintain privacy and/or compliance with any applicable privacy laws. In some cases, the discovery information associated with devices 110 can be deleted from the data store 222.

According to an aspect, the collected data may be monitored and measured. The collected data may be tracked over time and stored in the data store 222. In some examples, the optimizer 220 and/or one or more other components of the IBP manager 214 and/or cloud controller 208 are configured as or are operatively connected to a machine learning engine that uses machine learning capabilities to analyze the collected data for generating a profile about the subscriber 108 including information about the LAN 106 and the devices 110 communicating on the LAN 106. For example, a subscriber profile may comprise a data-based representation or model of the data transmission capabilities and data usages, and data transfer patterns/behaviors associated with the subscriber 108 network.

The optimizer 220 may be configured to analyze the subscriber profile in view of business rules and implemented prioritization policies for identifying where bottlenecks and other network performance issues may exist on the LAN 106, such as congestions, crowded channels, bandwidth being allocated to lower priority devices 110 and affecting performance of higher priority devices, etc. The optimizer 220 is illustrative of a software application, module, or computing device operative or configured to use machine learning capabilities to learn about the LAN 106 and the devices 110 that communicate on the LAN in order to determine criteria and priority values for automatically classifying traffic flows and to determine bandwidth allocation rules, optimizations, and other traffic management instructions based on known and learned information that can be used by the router 112 to optimize performance of data flows. For example, the optimizer 220 may be configured to identify various parameters and attributes associated with bottlenecks and other network performance issues such that the conditions may be corrected or modified to improve performance of data flows on the LAN 106 and the quality of experience from a user perspective.

In some examples, the optimizer 220 may be configured to access and analyze the rules/policies used by the priority scheduler 224 to prioritize traffic and control how QoS is handled on the LAN 106. The optimizer 220 may be further configured to create and apply one or more additional or alternative traffic prioritization policies that may be used by the priority scheduler 224 to improve network performance and user experience. For example, network performance may be improved by utilizing the optimizer 220 to dynamically create and configure traffic prioritization policies that define different traffic classification types that a data flow can be classified as and different optimizations that can be performed to improve network performance and user experience. Each traffic classification type may have an associated ranked priority value, different traffic classification criteria, an assigned queue having different queue parameters (e.g., reserved bandwidth amount, buffer size, ranking amongst other traffic classifications), etc. The traffic classifications may be based on business rules, user-defined rules, and the machine learned subscriber profile. That is, the classifications, classification criteria, mappings of the classifications to queues, queue parameters, queue scheduling, and optimizations may be customized for the subscriber LAN 106 based on the learned data transmission capabilities, data usages, and data transfer patterns/behaviors associated with the subscriber's network, user preferences, and business rules.

In some examples, machine-learning may be utilized to empirically learn historical traffic patterns and an association between these patterns and IP address and port combinations and/or an explicit signal (e.g., indication of the application/service associated with the communication) provided by a device 110. A traffic pattern and an associated IP address/port combination and/or explicit signal may be used to create an inference between an application/service associated with the IP address/port combination and/or explicit signal and a classification type. As an example, the optimizer 220 may learn a particular traffic pattern and an association between the traffic pattern and a particular IP address/port combination or a particular explicit signal. The traffic pattern may have a learned or assigned traffic classification type, wherein the traffic classification type may be associated with a particular queue having a priority ranking that may be used to control one or a combination of: order, transmission rate, bandwidth allocation, buffer size, scheduling, and/or other parameter of a traffic flow classified as the traffic classification type and assigned to the queue. As such, when the particular IP address/port combination and/or explicit signal is identified in association with a traffic flow, the traffic flow may be classified as the particular traffic classification type, assigned to the particular queue, and prioritized based at least in part on an identification of its IP address/port combination and/or explicit signal.

One example traffic pattern may include a data transfer pattern comprised of short but fast downloads of video segments at relatively long intervals (e.g., every 30 seconds). In contrast and as another example, an online game session may have a data transfer pattern comprised of small payloads (e.g., <1000 bytes) transmitted at shorter intervals (e.g., every 10 ms). In contrast and as another example, a telemedicine session, where high quality video for treatment may be desired, may have a data transfer pattern comprised of larger payloads transmitted at shorter intervals. As can be appreciated additional and/or alternative traffic patterns learned in association with a particular device 110, explicit signal, application/service, server, user, or combination thereof are possible and are within the scope of the present disclosure. The router 112 may be configured to support multiple traffic classification types and classification-based queuing. For example, the optimizer 220 may be configured to define and apply one or more traffic prioritization policies that may be used by the classifier 218 to classify a traffic flow into a traffic classification. For example, a traffic classification of a traffic flow can be compared against the traffic classification of another traffic flow for enabling the router 112 to weigh the relative importance of one packet against another. The classifier 218 is illustrative of a software application, module, or computing device operative or configured to analyze traffic packets for determining a classification for a traffic flow according to a prioritization policy comprising one or more classification rules. In some examples, the classifier 218 may be stateful so that it can handle IP fragmentation correctly. Queues may be created for different traffic classifications, wherein the queues may have different parameters/attributes that define how the queue output may be configured and scheduled. In some examples, a queue may be a dedicated portion of memory. The classification of the packet may be used to determine how the packet is queued and handled along its path to its destination on the LAN 106. Non-limiting examples of collected data that may be used as traffic classification criteria may include information about the device 110, application/service, data type, user, whether the device is attended or unattended, and about the status of the network (e.g., router speed, channels and capacities, number of connected devices 110, available bandwidth, signal strengths).

As an example, a traffic prioritization policy may define a plurality of ranked traffic classifications and a set of parameters that may include various pieces of collected data to evaluate for classifying a traffic flow into the classification. As an example, a traffic classification may define a set of criteria, parameters, or conditions of a traffic flow (e.g., a particular application operating on a particular device 110 and in an attended state) that, when satisfied, may cause a traffic flow to be assigned to the traffic classification. The traffic flow may be marked with a designation of the traffic classification, which may be mapped to a queue configured with a particular priority value/level that may define parameters used to service the traffic flow.

In some examples, the traffic classification may be used to control the flow of traffic by managing bandwidth allocations (e.g., limit amounts, maximum and committed rate parameters, allocated queue/memory buffer sizes, drop profiles, bandwidth dependency associations). For example, a traffic flow with a higher-ranked traffic classification may be assigned a larger amount of bandwidth of the total bandwidth available on the LAN 106, while another traffic flow with a lower-ranked traffic classification may be assigned less bandwidth. Traffic classifications and queue characteristics may be dynamically implemented based on various conditions (e.g., time of day, day of week, current network conditions, amounts of certain types of traffic). For example, a set of prioritization policies may optimize traffic flows on the LAN 106 at certain times, while another set of prioritization policies may optimize traffic flows on the LAN at other times. The various types and conditions that may be associated with a set of prioritization policies may be learned by the machine learning engine.

According to an implementation example, traffic may be classified based on a variety of criteria. In one example, the classifier 218 may be configured to classify packets based on an evaluation of one or various combinations of: source/destination IP address, protocol (e.g., TCP, UDP, etc.), source/destination port, DSCP (Differentiated Services Code Point) value (e.g., provided by a device 110 and that may indicate a particular application/service associated with the communication traffic), and source/destination MAC address. In some examples, additional criteria may be used as part of classifying traffic, such as whether the device is attended or unattended, the number of other devices 110 communicating on the LAN 106, available communication channels, device signal strengths, etc. For example, the one or a combination of various criteria may be evaluated by the classifier 218 for classifying a traffic flow according to one or more classification rules. In some examples, at least some of the various criteria are associated with learned data transfer patterns.

According to an implementation example, a criterion for a traffic classification may include a determination of a particular device 110 and/or device type receiving and/or sending the traffic. For example, the device 110 may be identified by a MAC address, an IP address, or other identifier. In some examples, a listing of devices 110, associated identifiers, communication parameters, priority parameters, etc., may be stored in the data store 222. As will be described in further detail below, in some examples, various traffic patterns of a device 110 may be learned and stored in associated with the device 110 in the data store 222.

According to another implementation example, traffic may be classified based at least in part on a determination of whether the device 110 is in an attended versus unattended state. For example, sensor data may be captured and provided by a device 110 (e.g., with the user's permission), which can be evaluated and used to determine whether the device 110 is attended or unattended. An attended versus unattended state of a device 110 may be used as a factor in determining a priority classification of traffic flow to/from the device 110 (i.e., traffic classification), wherein an unattended device may be classified in a queue with lower priority than an attended device. Examples of sensor data may include microphone data, camera data, accelerometer data, etc. In some examples, device attendance states may be monitored by the classifier 218. In other examples, device attendance may be monitored by a separate component that provides device attendance information to the classifier 218. Other methods of determining an attended versus unattended status may be used and are within the scope of the present disclosure. In some examples, the various traffic patterns of a device 110 that may be learned and stored in associated with the device 110 in the data store 222 may include device attendance state information.

According to another implementation example, a criterion for a traffic classification may include a determination of a particular communication protocol. For example, a particular communication protocol may be used as a criterion evaluated by the classifier 218 for classifying a traffic flow according to one or more classification rules. As an example, UDP (User Datagram Protocol) traffic, which is oftentimes used in time-sensitive communications where speed may be preferred over occasionally-dropped packets, may be identified and classified as non-queue-building; wherein TCP/IP (Transmission Control Protocol/Internet Protocol) traffic, which may be used by applications/services that require high reliability and where transmission time may be relatively less critical, may be identified and classified as queue-building. Examples of TCP applications/services may include video streaming applications/services, application downloads/updates, email applications, etc. Other traffic types that may be classified as non-queue-building based on a communication protocol may further include L4S (Low Latency Low Loss Scalable) traffic. In some examples, the communication protocol may be identified based on information included in an IP header.

According to another implementation example, traffic may be classified based at least in part on the application/service sending/receiving the traffic flow. As part of using the application/service as a classification parameter, the classifier 218 may be configured to identify the application/service. In some examples, an application/service endpoint (e.g., device 110 or server 118) may apply a tag or marking, such as a value, to a traffic flow (e.g., in a DSCP field of the IPv4 or IPv6 packet header) that may be recognized by the classifier 218. In some examples, the value may correspond with and indicate a particular application/service and/or server 118, such that the classifier 218 is able to determine the application/service and/or server associated with the traffic flow. In other examples, the value may correspond with and indicate whether the traffic is queue-building or non-queue-building. In other examples, the value may correspond with and indicate whether the traffic is related to a particular traffic classification. In some examples, the application/service may be identified based on an IP address and port combination that may be learned by the optimizer 220 by observing historical traffic patterns and IP address and port combinations.

According to another implementation example, traffic may be classified based at least in part on business rules and user-input priority settings as classification criteria/rules. For example, a subscriber 108 or other user may be enabled to designate a priority setting for a particular data flow, device 110, application/service, data type, explicit signal, etc., which may be used as a criterion when classifying a data flow. In some examples, a user-input priority setting may be included as a traffic classification type, wherein one or a combination of criteria for the classification type, priority value, and queue parameters may be set by the user or automatically determined and applied to the classification type.

According to another implementation example, a criterion for a traffic classification may include a determination of whether a traffic flow is queue-building or non-queue-building. In one example, traffic determined to be queue-building may be classified into one classification mapped to a particular queue, while traffic determined to be non-queue-building may be classified into another classification mapped to another queue. In another example, traffic determined to be queue-building may meet one criterion of a set of criteria used to classify and map traffic flows into a particular queue. The classifier 218 may be configured to determine whether a traffic flow is queue-building or non-queue-building based a set of classification rules defining classification criteria. In some examples, the optimizer 220 is configured to use machine learning to determine the set of criteria used to determine whether a traffic flow is queue-building or non-queue-building based on observed traffic/data transfer patterns. As an example, queue-building traffic flows may include latency-insensitive traffic that may be sent by an application or service at a relatively low data rate and/or in a smooth and consistent manner, such as downloads, file transfers, etc. As another example, non-queue-building traffic flows may include latency-sensitive traffic that may be characterized by smaller payloads transmitted at shorter intervals. For example, latency-sensitive traffic, which may result in glitches or unresponsive service at low data rates, may include traffic such as VoIP (Voice over Internet Protocol), video conferencing, online/cloud gaming, live streaming, DNS (Domain Name Service) lookups, etc.

The optimizer 220 may be configured to use machine learning techniques to analyze data collected by the data collector 216 and data from the classifier 218, observe traffic patterns, identify traffic flows that may cause queue build up, and learn attributes of the traffic flows and queue-building behaviors. In some examples, the optimizer 220 may include or be in communication with a flow analyzer configured to identify flows that may cause queue build up. In some examples, the flow analyzer may utilize per-flow traffic statistics included in historical data collected and stored by the data collector 216 to identify whether a traffic flow may exceed the available capacity of the subscriber's link and/or LAN 106, and thus may cause a queue to form.

Attributes of the flow, the access network 104 link, and/or the LAN 106 may additionally be collected and stored by the data collector 216 and used by the optimizer 220 to learn associations between attributes and queue building behavior, store (e.g., in the data store 222) the learned associations as classifier rules that can be used by the classifier 218 to classify traffic flows as queue-building, non-queue-building, and/or into other traffic classifications. As an example, attributes may include information about the device 110, application/service used, port, IP address, protocol used, data type, date and time, network speed, available bandwidth, wireless band and channel used, signal strength, number of other devices 110 communicating on the LAN 106, performance metrics, etc. That is, various sets of attributes may be learned that correlate with a queue-building, non-queue-building, or other type of traffic flow, wherein a particular traffic flow may be classified as queue-building, non-queue-building, or other traffic classification at different times and/or when different attributes are observed.

In some examples, the optimizer 220 may be further configured to define and enable one or more optimizations that may be applied to a traffic flow based on a set of defined conditions/criteria to improve network performance. Non-limiting examples of collected data that may be used as criteria for an optimization may include information about the device 110 (e.g., device type, screen size, application/service, data type, user, whether the device is attended or unattended) and about the status of the network (e.g., router speed, channels and capacities, number of connected devices 110, available bandwidth, signal strengths).

Non-limiting examples of optimizations may include actions such as a designation of a particular frequency channel and band (e.g., use a less-crowded higher frequency band for a latency-sensitive (e.g., non-queue-building) traffic flow and a lower frequency band for a traffic flow that is not latency-sensitive (e.g., queue-building), a reduction of quality of a stream (e.g., reduce image quality of a video stream to a small-screen device 110), assigning a traffic flow to be serviced by a particular access point, etc. As another example, an optimization may include an instruction to the access point 212 to shut down one antenna and increase strength to another antenna for increasing the signal strength and throughput to a particular device 110. Other optimizations are possible and are within the scope of the present disclosure. In some examples, classification types, classification criteria/rules, priority values, bandwidth allocation rules, optimizations, and/or other traffic management instructions may be dynamically created and/or updated by the optimizer 220. The classifications, classification criteria/rules, bandwidth allocation rules, optimizations, and/or other traffic management instructions may be stored in the data store 222.

Figure 3:
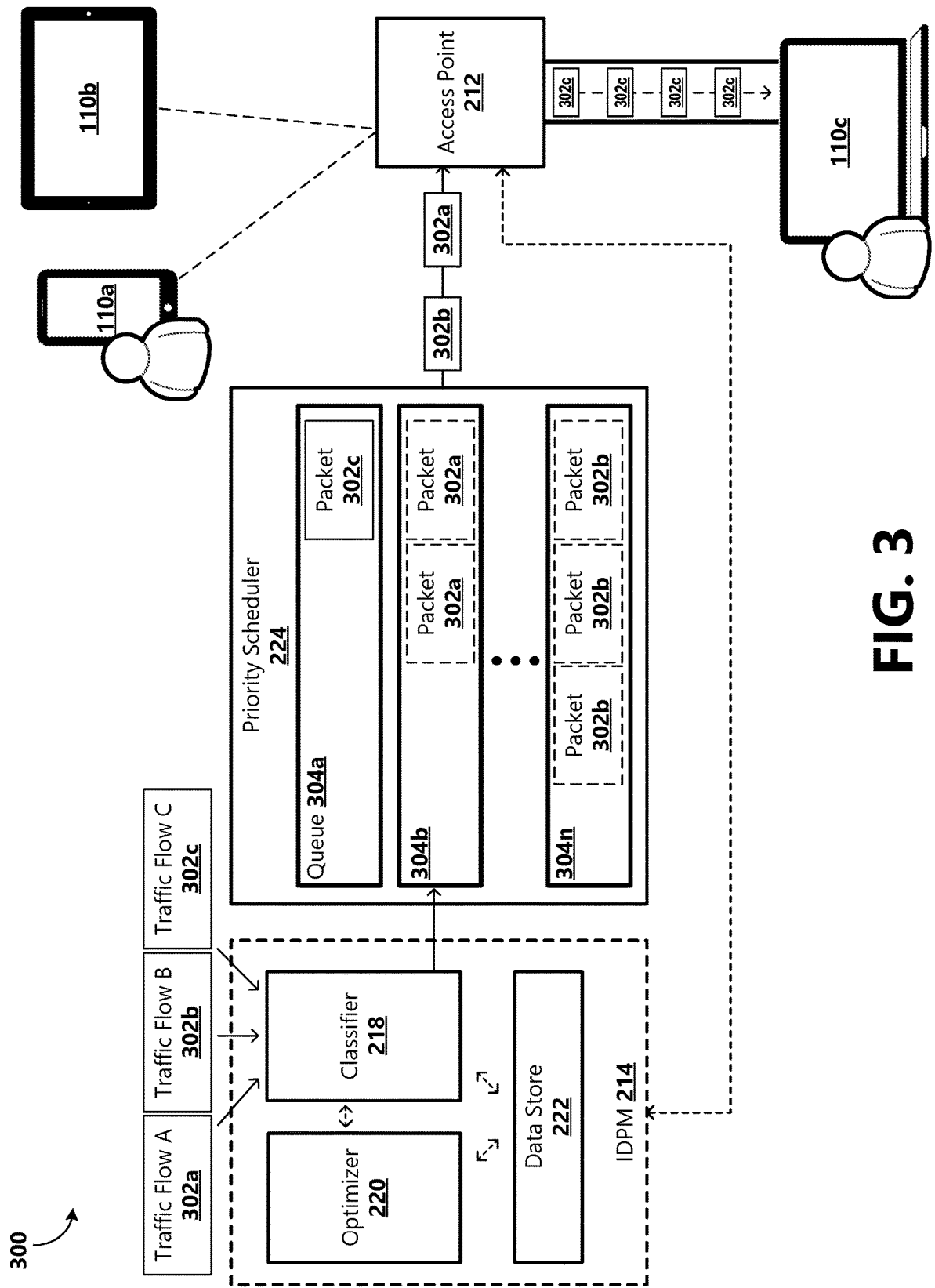
FIG. 3 is a data flow diagram showing a bandwidth allocation example.

With reference now to FIG. 3, a data flow diagram 300 is illustrated showing a traffic prioritization and bandwidth allocation example. In the illustrated example, three devices 110a-c may be connected to a LAN 106 provided by a router 112 that includes or is connected to an IBP manager 214. In some examples, each of the devices 110a-c may report information to the IBP manager 214. In some examples, the devices 110a-c may report to the IBP manager 214 in response to a beacon or other request for response. In other examples, the devices 110a-c may be configured to report to the IBP manager 214 continually. The devices 110a-c may be known by the IBP manager 214 based on previous reporting data and communications with the router 112, and may be stored in a database or table included in the data store 222. In some examples, the access point 212 and any other access points on the LAN 106 may provide reports to the IBP manager 214 on information about the LAN 106, such as a number of connected devices 110, utilization (e.g., percentage of time) of a channel, available bandwidth capacity for a new device 110, an MCS (Modulation and Coding Scheme) index value indicative of a data rate of a link (e.g., based on a number of spatial streams, modulation types, and coding rates), available channels, channel widths, signal strength values, etc. In some examples, information reported to the IBP manager 214 may be used in real time or near-real time to determine a current status of the LAN 106 and devices 110 connected to the LAN 106. In other examples, information reported to the IBP manager 214 may be stored in the data store 222 and used to learn behaviors and usage profiles of the LAN 106 and the devices 110 connected to the LAN 106 that can be used to classify and prioritize traffic.

As an example, a first device 110a may be a mobile phone reporting that a particular video streaming application is being used on the device 110a to request video streaming data. In an example aspect, the first device 110a may further report that it is in an attended state, wherein the attended state may describe a state where the device 110a detects the presence of a user. For example, the presence of the user may be detected via interaction with the first device 110a and/or information detected via a camera, microphone, or other sensor included in or associated with the first device 110a.

A second device 110b may be a tablet device reporting that it is in a stand-by mode and is requesting a download of data as part of an automatic operating system or application update. The second device 110b may further report that it is in an unattended state, wherein the unattended state may describe a state where the device 110b does not detect the presence of a user via user interaction with the device 110b or via information detected via the camera, microphone, or other sensor. Past collected reporting data from the device 110b may further indicate that the device 110b is rarely in an attended state, and accordingly, likelihood of active engagement with a user may be low.

A third device 110c may be a laptop computer reporting that an online videoconferencing application is being used on the device 110c to stream (e.g., upload and download) audio and video data. The third device 110c may further report that it is in an attended state based on detected user interaction and/or user presence. The access point 212 may additionally report information to the IBP manager 214. Information that may be included in or determined from the reported information and/or past collected and analyzed data, may include information about the devices 110a-c (e.g., number of devices, device types, screen sizes, processor and memory capabilities, signal strengths, capacities of links to the devices), bandwidth capacity, channel usages, etc.

The IBP manager 214 may use the classifier 218 to classify the traffic flows 302a-c (generally 302) of the three devices 110a-c into one or more traffic classification types. The classifier 218 may access a prioritization policy stored in the data store 222 that includes classification rules that define various criteria to evaluate for determining traffic classifications for the traffic flows 302. For example, the prioritization policy may define to classify packets based on one or a combination of: source/destination IP address, protocol, source/destination port, explicit signal (e.g., DiffServ field), and source/destination MAC address.

In an illustrative example, the prioritization policy may include, as a criterion, to evaluate the attendance state of the devices 110 as part of classifying the traffic flows 302. According to the example, based on an evaluation of the attended/unattended states of the devices 110 and other criteria, a determination may be made to classify the third traffic flow 302c associated with the third device 110c as a first classification type, the first traffic flow 302a associated with the first device 110a as a second classification type, and the second traffic flow 302b associated with the second device 110b as a third classification type. The first classification type may have a corresponding priority value that may be ranked highest in priority amongst the classification types included in the prioritization policy. The second classification type may have a corresponding priority value that may be ranked below the first classification type, and the third classification type may have a corresponding priority value that may be ranked below the second classification type. Each classification type may be mapped to a different queue 304a-c (generally 304), wherein each queue may have different parameters assigned to it that define the queue's priority ranking, transmission rate, bandwidth allocation, buffer size, scheduling, etc. The classifier 218 may be configured to mark the traffic flows 302 with an indication of the classification type, which may be used to map/assign the traffic flows 302 to the correct queues 304. In some examples, the classifier 218 may be further configured to mark one or more of the traffic flows 302 with an indication of one or more optimizations that may be determined for the traffic flows 302 to increase network performance. As an example, the video quality of video streaming data delivered to the first device 110a may be reduced based on the screen size of the device 110a. Additionally, the first traffic flow 302a may be transmitted on a different band (than the third traffic flow 302c and the second traffic flow 302b) based on an evaluation of usages of the frequency bands/channels, the signal strength of the connection with the first device 110a, etc.

According to an aspect, the priority scheduler 224 may be configured to process the traffic flows 302a-c based on the queues 304 to which the traffic flows directed. For example, based on the traffic classifications determined by the classifier 218, the traffic flows 302 may be prioritized and delivered (e.g., to/from an intended device 110) according to priority, bandwidth allocation rules, optimizations, and other traffic management instructions. As described above, the traffic classifications, prioritizations, bandwidth allocation rules, optimizations, and other traffic management instructions may be created and implemented based on data collected about the subscriber LAN 106 and may be configured to optimize traffic flows on the LAN. Accordingly, the traffic flows 302 may be delivered with increased throughput and minimal lag, dropped packets, etc., for improved bandwidth allocation and better quality service and experience.

Figure 4:
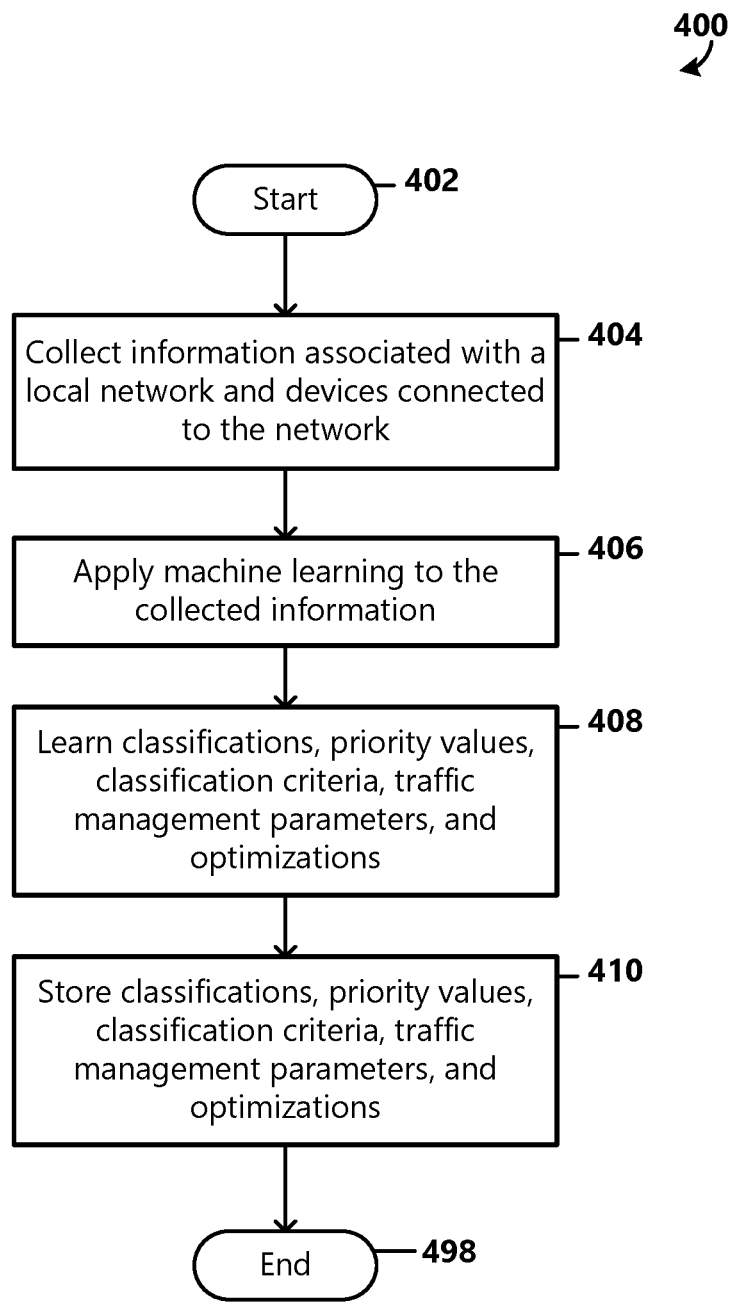
FIG. 4 is a flow chart depicting general stages of an example process for generating prioritization policies for optimizing performance of data flows on a network according to an embodiment.

FIG. 4 is a flow chart depicting general stages of an example process or method 400 for generating prioritization policies for optimizing performance of data flows on a LAN 106 according to an embodiment. The method 400 starts at OPERATION 402 and proceeds to OPERATION 404, where various information about the LAN 106, the router 112 and access point(s) 212, and about the various devices 110 connected to the LAN 106 may be collected and stored. According to an example, the data collector 216 may be used to collect information associated with available amounts and usages of bandwidth, available and utilized frequency bands and channels, a number of connected devices 110, device identification (e.g., IP address, MAC address) and usage, application/service identification (e.g., explicit signal, IP address and port combination) and usage, queue-building versus non-queue-building traffic classification criteria, whether a device is being actively or passively used (i.e., attendance state), signal levels, network speeds, etc. In some examples, the devices 110 may send explicit signaling to the data collector 216 comprising information about the devices, network connection/performance information, application/service usage, and other usage data. In other examples, the data collector 216 may be configured to request and collect data obtained by the router 112 as part of receiving and routing traffic between the access network 104 and devices 110 connected to the LAN 106.

At OPERATION 406, one or more machine learning algorithms may be applied to the collected information, and at OPERATION 408, one or more prioritization policies may be determined. For example, the cloud controller 208 and/or IBP manager 214 may utilize machine learning to observe traffic patterns and learn data usage/transfer behaviors (e.g., usage of a particular delivery network, amount of usage, time of usage, payload sizes, transmission intervals, etc.). For example, network configuration data and usage/transfer data may be stored in the data store 222, and machine learning algorithms may be used to analyze the stored data for learning the network topologies and data usage/transfer patterns and behaviors (e.g., of a subscriber, a plurality of subscribers on a same node 206, different devices 110 connected to a LAN 106, different applications/services, different IP address and node combinations, etc.). Accordingly, the cloud controller 208 and/or IBP manager 214 may be enabled to select a prioritization policy to apply in different scenarios based at least in part on machine-learned network information, data usage/transfer patterns and behaviors, various business rules, etc. According to an aspect, a prioritization policy may include a plurality of classification types, wherein each classification type may have a corresponding priority value and queue 304 that may be used to prioritize traffic streams. Each traffic classification type may correspond with a set of criteria, such that when attributes of a traffic flow satisfy a set of criteria, the traffic flow may be associated with a particular classification and mapped to a particular queue 304. Additionally, a prioritization policy may further include criteria corresponding to various bandwidth allocation rules and other traffic management instructions, such that when attributes of a traffic flow satisfy a set of criteria, one or more bandwidth allocation rules or other traffic management instructions may be applied to the traffic flow. Further, various criteria/conditions for various optimization actions may be determined.

At OPERATION 410, the one or more prioritization policies and optimizations may be stored in the data store 222 where they can be accessed by the router 112 to prioritize traffic. The process 400 ends at OPERATION 498.

Figure 5:
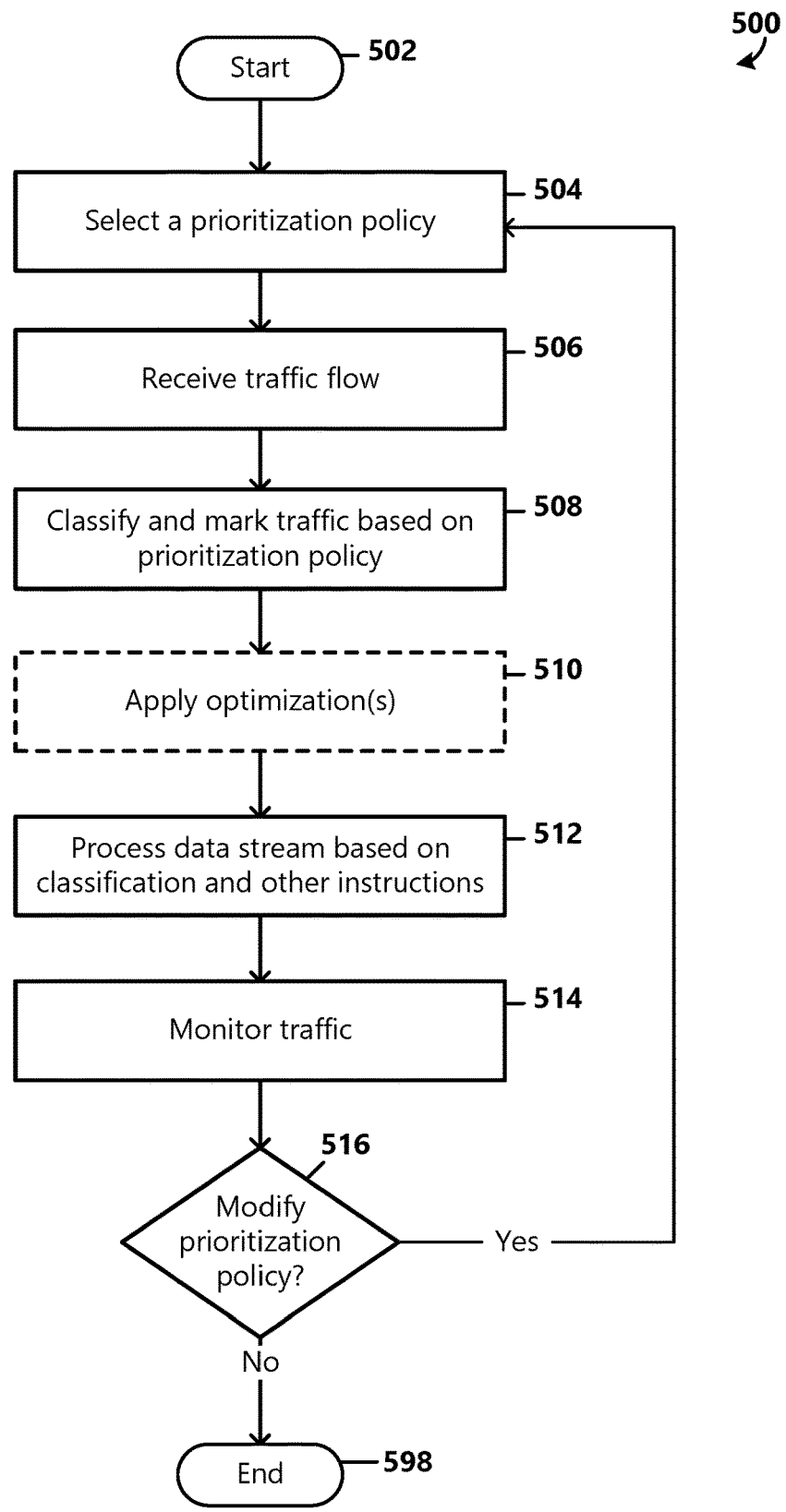
FIG. 5 is a flow chart depicting general stages of an example process for using a prioritization policies to optimize performance of data flows on a network according to an embodiment.

FIG. 5 is a flow chart depicting general stages of an example process or method 500 for implementing a prioritization policy for optimizing performance of data flows on a LAN 106 according to an embodiment. The method 500 starts at OPERATION 502 and proceeds to OPERATION 504, where a prioritization policy may be selected for use by the router 112. In some examples, the prioritization policy may be selected based on one or more attributes/factors of the LAN 106. For example, the state of the LAN 106 may be monitored, and depending on the number of devices 110 connected to the LAN 106, which devices 110 may be connected to the LAN, current activities/usages of the devices 110, etc., a particular prioritization policy may be selected. The LAN 106 attributes/factors that correspond with a particular prioritization policy may be based on machine-learned network and device utilization and behavior information.

At OPERATION 506, a traffic flow 302 may be received by the router 112, and at OPERATION 508, the classifier 218 may be used to evaluate various criteria to classify the traffic flow 302 according to a traffic classification type included in the prioritization policy. The determined traffic classification type may correspond with a priority value, and the traffic flow 302 may be marked with an indication of the determined traffic classification type and/or priority value.

At OPTIONAL OPERATION 510, one or more optimizations may be determined to improve performance of the data flow 302 (and/or higher prioritized data flows), and may be applied to the traffic flow 302.

At OPERATION 512, the data flow 302 may be assigned to a queue corresponding to the determined traffic classification type, wherein the queue may be assigned with a certain amount of bandwidth, memory, ranking, transmission rate, etc. The data flow 302 may be processed based on the queue parameters and delivered to its intended device 110.

At OPERATION 514, the traffic on the LAN 106 may be monitored. For example, various information about the LAN 106, the router 112 and access point(s) 212, and about the various devices 110 connected to the LAN 106 may be collected and monitored. According to an example, the data collector 216 may be used to collect information associated with available amounts and usages of bandwidth, available and utilized frequency bands and channels, a number of connected devices 110, device identification and usage, application/service identification, queue-building versus non-queue-building traffic classification criteria, whether a device is being actively or passively used, signal levels, network speeds, etc.

At OPERATION 516, a determination may be made as to whether to modify the prioritization policy to another prioritization policy or to continue using the current prioritization policy. For example, the determination may be based on a determination of how the network is performing based on how traffic prioritizations and associated bandwidth allocations are affecting throughput and application/service performance. As an example, if increased lag is detected, a determination may be made to return to OPERATION 504 to select and implement another prioritization policy. The method 500 may end at OPERATION 598.

Figure 6:
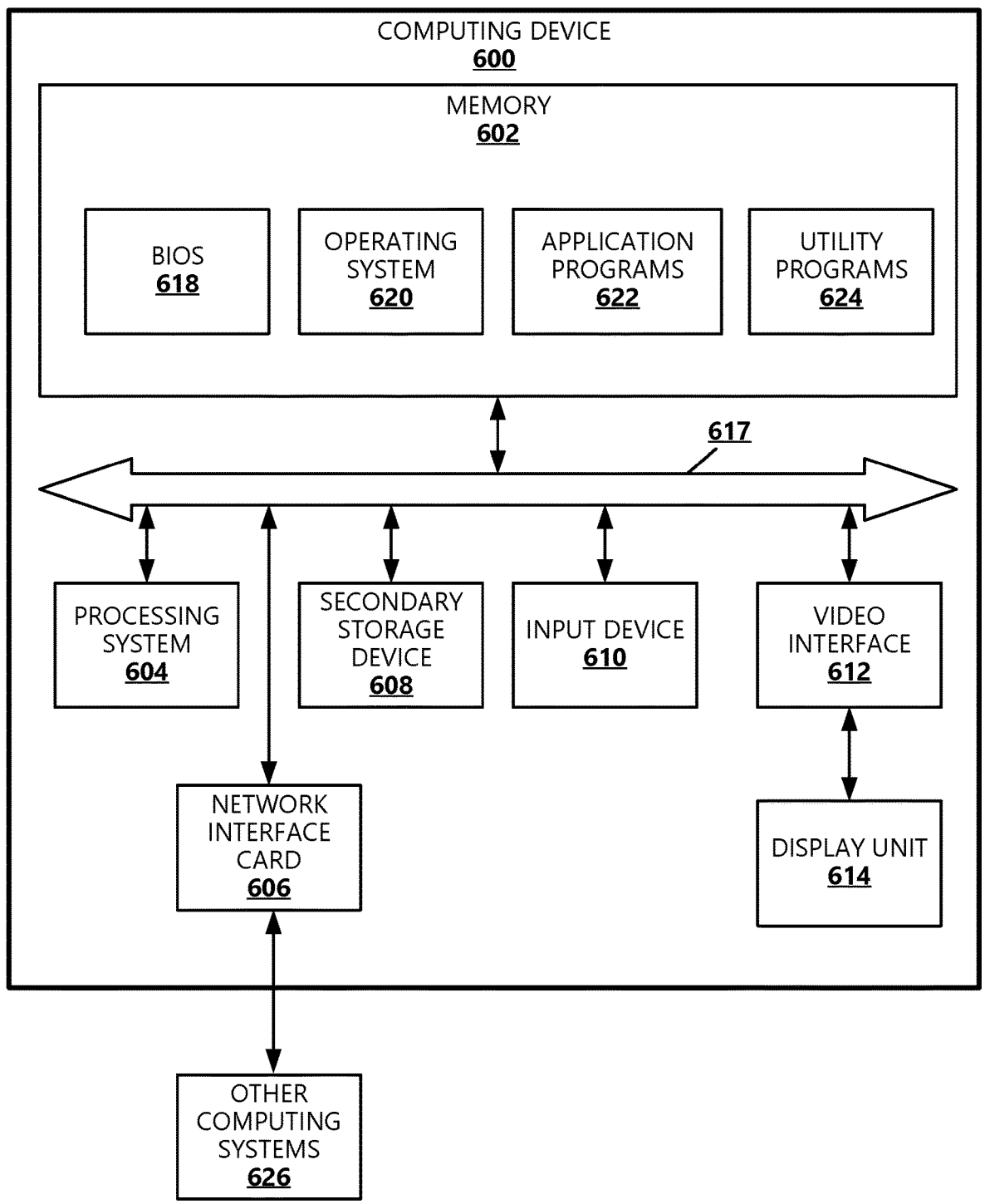
FIG. 6 is a block diagram illustrating example physical components of a computing device or system with which embodiments may be practiced.

FIG. 6 is a block diagram illustrating example physical components of a computing device 600 or system with which embodiments may be practiced. It should be appreciated that in other embodiments, different hardware components other than those illustrated in the example of FIG. 6 may be used. Computing devices may be implemented in different ways in different embodiments. For instance, in the example of FIG. 6, the computing device 600 includes a processing system 604, memory 602, a network interface card 606 (wired and/or wireless), a secondary storage device 608, an input device 610, a video interface 612, a display unit 614, and a communication medium 617. In other embodiments, the computing device 600 may be implemented using more or fewer hardware components (e.g., a video interface, a display unit, or an input device) or in combination with other types of computer systems 626 and program modules.

The memory 602 includes one or more computer-readable storage media capable of storing data and/or computer-executable instructions. Memory 602 may store the computer-executable instructions that, when executed by a processor or processing unit of the processing system 604, cause operations, such as the operations described above with respect to FIGS. 4 and 5) to provide intelligent bandwidth prioritization and allocation. In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and non-volatile, removable and non-removable media implemented in various methods or technologies for storage and retrieval of information. Such information can include data structures, program modules, computer-executable instructions, or other data.

The processing system 604 includes one or more processing units (e.g., one or more processors), which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., W-Fi®, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 617 facilitates communication among the hardware components of the computing device 600. In different embodiments, the communications medium 617 facilitates communication among different components of the computing device 600. For instance, in the example of FIG. 6, the communications medium 617 facilitates communication among the memory 602, the processing system 604, the network interface card 606, the secondary storage device 608, the input device 610, and the video interface 612. In different embodiments, the communications medium 617 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs or program code 622 that, when executed by the processing system 604, cause the computing device 600 to provide applications to users. The memory 602 also stores one or more utility programs 624 that, when executed by the processing system 604, cause the computing device 600 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 7:
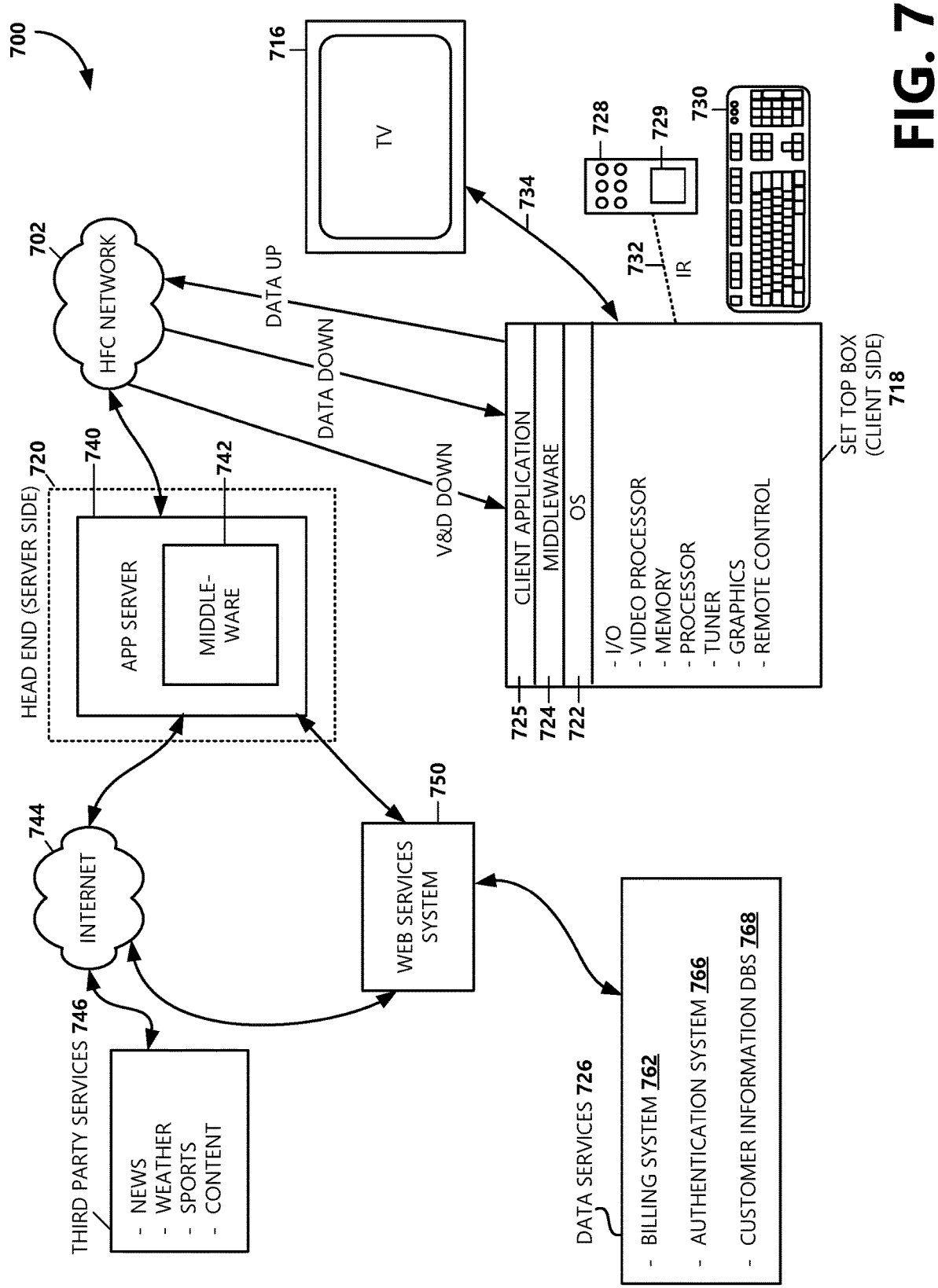
FIG. 7 is a block diagram illustrating components of a cable services system architecture providing an example operating environment according to aspects of the present disclosure.

FIG. 7 is a block diagram illustrating a cable television services system 700 (hereafter referred to as "CATV") architecture providing an operating environment according to an aspect. According to aspects, the service provider 102 may operate in the form of a CATV 700 as illustrated and described in FIG. 7. As should be appreciated, a CATV services system 700 is but one of various types of systems that can be utilized for providing an operating environment for providing supplemental content functionality described herein. Referring now to FIG. 7, digital and analog video programming, information content and interactive television services are provided via a HFC network 702 to a television set 716 for consumption by a cable television/services system customer. As is known to those skilled in the art, HFC networks 702 combine both fiber optic cable lines and coaxial cable lines. Typically, fiber optic cable lines run from the cable head end 720 to neighborhoods of subscribers. Coaxial cable lines run from the optical fiber feeders to each customer or subscriber.

The CATV system 700 is in the form of a distributed client-server computing system for providing video and data flow across the HFC network 702 between server-side services providers (e.g., cable television/services providers) via a server-side head end 720 and a client-side customer via a set-top box (STB) 718 functionally connected to a customer receiving device, such as the television set 716. The functionality of the HFC network 702 allows for efficient bidirectional data flow between the set-top box 718 and an application server 740 of the server-side head end 720. As is understood by those skilled in the art, modern CATV systems 700 can provide a variety of services across the HFC network 702 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 702 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end 720, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 702 through a video/data downlink and data via a data downlink. The STB 718 can transmit data from the client side of the CATV system 700 to the server side of the CATV system 700 via the HFC network 702 via one data uplink. The video/data downlink is an "in band" downlink that allows for digital and analog video and data signaling from the server side of the CATV system 700 through the HFC network 702 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 702 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 702 to the STB 718. Operation of data transport between components of the CATV system 700, described with reference to FIG. 7, is well known to those skilled in the art.

Referring still to FIG. 7, the head end 720 of the CATV system 700 is positioned on the server side of the CATV system and includes hardware and software systems responsible for originating and managing content for distributing through the HFC network 702 to client-side STBs 718 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 702. As described above, the application server 740 includes a middleware layer 742 for processing and preparing data from the head end 720 of the CATV system 700 for receipt and use by the client-side STB 718. For example, the application server 740 via the middleware layer 742 can obtain supplemental content from third-party services 746 via the Internet 744 for transmitting to a customer through the HFC network 702, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 702 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 702 and the STB 718. Additionally, the application server 740 may receive data via the Internet 744.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 762 can include information such as a customer's name, street address, business identification number, Social Security number, credit history, and information regarding services and products subscribed to by the customer. According to embodiments, the billing system 762 can also include billing data for services and products subscribed to by the customer for bill processing, billing presentment and payment receipt. An authentication system 766 can include information such as secure user names, subscriber profiles, subscriber IDs, and passwords utilized by customers for access to network services. A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. As should be understood by those skilled in the art, the disparate systems 750, 762, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing intelligent bandwidth prioritization, the system comprising:
at least one processor; and
a memory coupled to the at least one processor, the memory including instructions that when executed by the at least one processor operate to:
select a prioritization policy to apply to an access point operating on a local network, wherein the prioritization policy comprises a plurality of traffic classifications, and wherein the prioritization policy selection is based on one or more attributes and/or factors of the local network;
receive a traffic flow at the access point;
classify the traffic flow according to a traffic classification of the selected prioritization policy;
apply a priority value to the traffic flow based on the traffic classification;
assign the traffic flow to a classification-based queue corresponding to the priority value;
process the traffic flow based on parameters of the assigned queue for delivering the traffic flow to an intended device of the local network;
monitor the traffic flow;
determine whether the traffic flow in the local network has degraded; and
if the traffic flow in the local network is determined to have degraded, dynamically modify the prioritization policy being applied to the access point.

2. The system of claim 1, wherein the queue includes parameters that define an amount of bandwidth allocated to the traffic flow.

3. The system of claim 1, wherein the prioritization policy comprises at least one classification rule that defines a set of criteria including an explicit signal corresponding with the traffic classification to evaluate for determining whether the traffic flow satisfies the criteria to be classified into the traffic classification, wherein the explicit signal is provided by a device on the local network associated with the traffic flow.

4. The system of claim 1, wherein the prioritization policy comprises at least one classification rule that defines a set of criteria associated with the traffic flow to evaluate for determining whether the traffic flow satisfies the criteria to be classified into the traffic classification.

5. The system of claim 4, wherein in determining whether the traffic flow satisfies the criteria associated with the traffic classification, the system is configured to determine whether an associated device connected to the local network is in an attended or unattended state.

6. The system of claim 4, wherein in determining whether the traffic flow satisfies the criteria associated with the traffic classification, the system is configured to determine whether the traffic flow is queue-building or non-queue-building.

7. The system of claim 6, wherein in determining whether the traffic flow is queue-building or non-queue-building, the system is configured to determine whether an IP address and port combination associated with the traffic flow corresponds with a queue-building classification or a non-queue-building classification.

8. The system of claim 4, wherein:
the prioritization policy further comprises at least one optimization that defines a set of criteria associated with the traffic flow to evaluate for determining whether the traffic flow satisfies the criteria; and when the traffic flow satisfies the criteria, the system is further configured to apply the at least one optimization to improve network performance.

9. The system of claim 8, wherein the at least one optimization includes one of:
assigning the traffic flow to a particular frequency band;
assigning the traffic flow to a particular frequency channel;
reducing image quality of the traffic flow; and
assigning the traffic flow to be serviced by a particular access point.

10. The system of claim 1, wherein prior to the selection of the prioritization policy, the system is configured to:
collect information about a local network and the devices connected to the local network;
apply machine learning to identify the local network topology and data usage behaviors of the devices;
determine a set of traffic classifications and associated criteria and queue parameters that can be used to classify traffic flows and improve network performance;
determine a set of network conditions that can be evaluated for applying the prioritization policy; and
store the set of traffic classifications and associated criteria, queue parameters, and network conditions as the prioritization policy in a data store.

11. A method for providing intelligent bandwidth prioritization, comprising:
selecting a prioritization policy to apply to an access point operating on a local network, wherein the prioritization policy comprises a plurality of traffic classifications, and wherein the prioritization policy selection is based on one or more attributes and/or factors of the local network;
receiving a traffic flow at the access point;
classifying the traffic flow according to a traffic classification of the selected prioritization policy;
applying a priority value to the traffic flow based on the traffic classification;
assigning the traffic flow to a classification-based queue corresponding to the priority value;
processing the traffic flow based on parameters of the assigned queue for delivering the traffic flow to an intended device of the local network;
monitoring the traffic flow;
determining whether the traffic flow in the local network has degraded; and
if the traffic flow in the local network is determined to have degraded, dynamically modifying the prioritization policy being applied to the access point.

12. The method of claim 11, wherein assigning the traffic flow to the queue comprises assigning the traffic flow to a queue having parameters that define an amount of bandwidth allocated to the traffic flow and an order in which the queue is prioritized amongst other queues.

13. The method of claim 11, wherein classifying the traffic flow into the traffic classification comprises determining whether an associated device connected to the local network is in an attended or unattended state.

14. The method of claim 11, wherein classifying the traffic flow into the traffic classification comprises at least one of:
determining whether the traffic flow includes an explicit signal corresponding with the traffic classification, wherein the explicit signal is provided by a device on the local network associated with the traffic flow; and
determining whether the traffic flow is queue-building or non-queue-building, comprising determining whether an IP address and port combination associated with the traffic flow corresponds with a queue-building classification or a non-queue-building classification.

15. The method of claim 11, further comprising evaluating a set of criteria associated with the traffic flow for determining whether the traffic flow satisfies the criteria to apply at least one optimization to the traffic flow to improve network performance.

16. The method of claim 15, wherein applying at least one optimization includes one of:
assigning the traffic flow to a particular frequency band;
assigning the traffic flow to a particular frequency channel;
reducing image quality of the traffic flow; and
assigning the traffic flow to be serviced by a particular access point.

17. The method of claim 16, further comprising:
determining a set of network conditions that can be evaluated for applying the prioritization policy; and
as part of selecting the prioritization policy, evaluating the set of network conditions for determining whether to apply the prioritization policy.

18. The method of claim 11, wherein prior to selecting the prioritization policy:
collecting information about the local network and the devices connected to the local network;
applying machine learning to identify the local network topology and data usage behaviors of the devices;
determining a set of traffic classifications and associated criteria and queue parameters that can be used to classify traffic flows and improve network performance; and
storing the set of traffic classifications and associated criteria and queue parameters as the prioritization policy in a data store.

19. A computer readable storage device that includes executable instructions which, when executed by a processor provide intelligent bandwidth prioritization, the instructions comprising:
collecting information about a local network and the devices connected to the local network;
applying machine learning to identify the local network topology and data usage behaviors of the devices;
determining a set of traffic classifications and associated prioritization policy, criteria, and queue parameters that can be used to classify traffic flows and improve network performance;
determining a set of network conditions that can be evaluated for applying the prioritization policy;
storing the determined set of traffic classifications and associated criteria, queue parameters, and network conditions as the prioritization policy;
evaluating the set of network conditions;
selecting the prioritization policy to apply to the local network based on the evaluation of the set of network conditions;
classifying a traffic flow received at one of the network devices according to a traffic classification of the determined set of traffic classifications;
applying a priority value to the traffic flow based on the traffic classification and based on the selected prioritization policy;
assigning the traffic flow to a classification-based queue corresponding to the applied priority value;
processing the traffic flow based on parameters of the assigned queue for delivering the traffic flow to an intended device of the local network;

monitoring the traffic flow;
determining whether the traffic flow in the local network has degraded; and
if the traffic flow in the local network is determined to have degraded, dynamically modifying the prioritization policy being applied to the local network.

20. The computer readable storage device of claim 19, wherein classifying the traffic flow into the traffic classification comprises at least one of:
identifying a device associated with the traffic flow;
identifying a service or application associated with the traffic flow;
determining a data type;
identifying a user associated with the traffic flow;
determining a protocol type;
determining whether an associated device connected to the local network is in an attended or unattended state; and
determining whether the traffic flow is queue-building or non-queue-building.

* * * * *